Aug. 4, 1942.　　　　E. B. LEAR　　　　2,291,816
BRAKE
Filed July 5, 1941
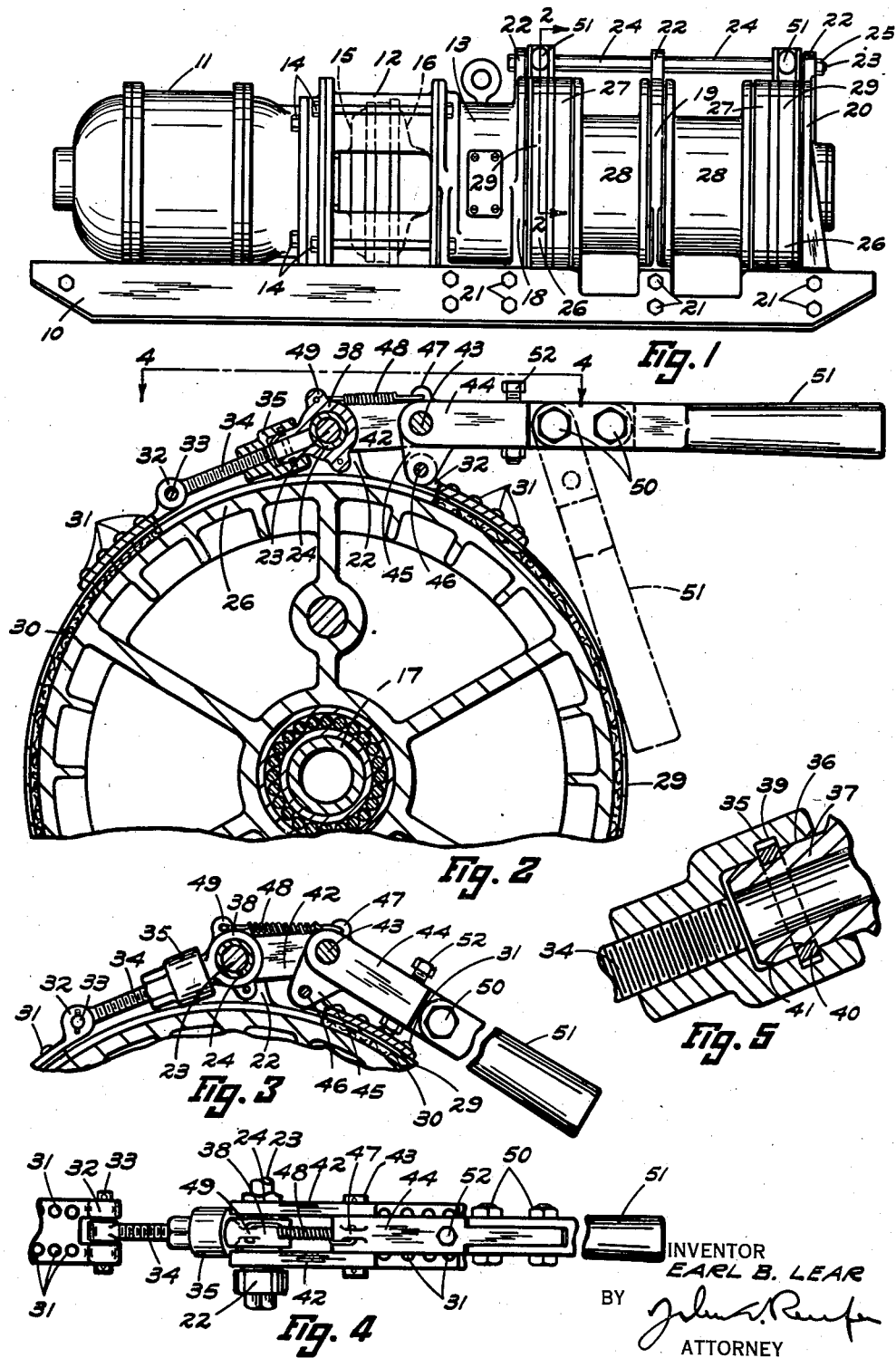
INVENTOR
EARL B. LEAR
BY
ATTORNEY Patented Aug. 4, 1942

2,291,816

UNITED STATES PATENT OFFICE 2,291,816

BRAKE

Earl B. Lear, Garfield Heights, Ohio, assignor to The Cleveland Rock Drill Company, Cleveland, Ohio, a corporation of Ohio Application July 5, 1941, Serial No. 401,246

4 Claims. (Cl. 188—77)

This invention relates broadly to hoisting mechanism but more particularly to an improved brake therefor.

One object of this invention is to provide a drum hoist with an improved brake mechanism readily operable and mounted on the hoist in a simple and efficient manner permitting adjustment of the brake without cessation of operation.

Another object of this invention is to produce a hand operated brake affording mechanical advantages through which relatively slight pressure applied on its operating handle effects a positive brake action preventing rotation of its component drum.

Other objects and advantages more or less ancillary to the foregoing reside in the specific construction and aggroupment of the elements peculiar to this structure, as will become apparent from a more complete examination of this specification.

In the drawing:

Fig. 1 is a side view of a hoist embodying the invention.

Fig. 2 is an enlarged cross sectional view taken in a plane indicated by line 2—2 in Fig. 1.

Fig. 3 is a portion of the view shown in Fig. 2 illustrating some of the parts in another position.

Fig. 4 is a view looking in the direction of the arrows 4—4 in Fig. 2.

Fig. 5 is an enlarged view of some of the parts shown in Fig. 2.

Referring to the drawing in which like numbers designate corresponding parts throughout the several views, 10 represents a base frame of usual design on which is rigidly mounted the hoist assembly shown to include a motor 11, an hydraulic coupling housing 12 and a gear reduction casing 13 all secured together by any suitable means such as bolts 14. Obviously the driving member 15 of the hydraulic coupling within the housing 12 is operatively connected to the motor 11 while the driven member 16 of the coupling is mounted on a shaft, not shown, extending into the gear reduction casing 13. Projecting longitudinally away from the casing 13 there is a tubular shaft 17 adequately journaled within longitudinally spaced bearing supports 18, 19 and 20, the first support 18 forming a part of the casing 13, while the last one forms the end of the hoist assembly shown in Fig. 1. Each of these supports is rigidly secured to the base frame 10 by any suitable means such as bolts 21, while the upper end of each support is provided with a lug 22 having a tie rod 23 extending therethrough. Mounted on the tie rod between each lug 22 there is a spacer tube 24 preventing flexing of the lugs 22 upon tightening of the tie rod 23 by means of a nut 25. It will now be understood that the bearing supports 18, 19 and 20 fasten at their lower end to the base frame 21 are also united at their upper ends by means of the tie rod 23, thereby resulting in a rigid bearing supporting frame for the tubular shaft 17, which shaft is operatively connected to the shaft extending from the driven member 16 of the hydraulic coupling through adequate gear reduction, not shown.

Rotatably mounted on the tubular shaft 17 adjacent each bearing support 18 and 20, there is a relatively narrow drum 26 operatively associated with a clutch plate 27 which in turn is interconnected with the driving shaft 17 by suitable gearing means in a manner causing the rotation of the plate 27 when the drum 26 is held against rotation and allowing the plate 27 to remain stationary while the drum 26 is free to rotate. Since the connections between the shaft 17, drum 26 and plate 27 form no part of this invention no further explanation is thought necessary other than pointing out that each plate 27 is drivingly connected with a rope receiving drum 28 rotatably mounted on the driving shaft 17, one on each side of the bearing support 19.

Referring now more particularly to the invention, there is at least partly surrounding each drum 26 a brake band 29 having secured to the inner side thereof an adequate brake lining 30. The band 29 is somewhat shorter than the periphery of the drum 26 and has secured to each of its end portions by means of rivets 31 a clevis 32. Pivotally secured to one of the clevises 32 by a cross pin 33 there is the eye of an eyebolt 34 having screwed on the other end thereof a nut 35. This nut is provided with an enlarged counterbore 36 adapted to rotatably receive the shank 37 of a member 38 rotatably mounted on the tubular spacer 24 above each drum 26. Intermediate its ends, the counterbore 36 is formed with an annular recess 39 within which is fitted a split annular key 40 which extends into an annular recess 41 provided on the shank 37, thereby locking the shank 37 or member 38 to the nut 35 against relative axial movement, while enabling relative rotation therebetween. On each side of the member 38 are disposed two links 42 having one end rotatably mounted on the tubular spacer 24, while the other end accommodates a cross pin 43 on which is pivotally mounted the inner end of a handle 44. Depending from this handle below the cross pin 43, there is an integral lug 45 pivotally connected to the other clevis 32 by a cross pin 46. Diametrically opposed from the lug 45 the handle 44 is provided with an upwardly projecting smaller lug 47 having hooked thereto one end of a tension spring 48 which has its other end hooked to a lug 49 provided on the member 38.

To the handle 44 which is preferably made of metal, there is secured by means of two bolts 50 a longitudinally extending handle grip 51 preferably made of wood or the like. Through the handle 44 there is also provided a stop bolt 52 engageable with the adjacent clevis 32 as shown in Fig. 3 for limiting pivotal downward movement of the handle on the cross pin 43.

From the foregoing, it will be understood that the entire brake mechanism, or more particularly the brake band and its operating parts, are actually carried by the tie rod 23 securing the bearing supports 18, 19 and 20 in position. When it is desired to lock the drum 26 against rotation in order to cause rotation of the plate 27 and of its component rope receiving drum 28, the operator will apply a relatively small downward pressure on the handle grip 51 causing its pivotal movement around the cross pin 43 and the consequential rotation of its lug 45 in a clockwise direction in Fig. 2, thereby bringing the adjacent end of the brake band 29 closer to the other end of the band and effecting a hard squeezing action on the drum 26 for locking the drum against rotation. When the downward pressure on the handle 51 is released the tension spring 48 will return the handle to its original or neutral position, as shown in Fig. 2 and consequently release the action of the brake band 29 on the drum 26 to allow its rotation. Length adjustment of brake band 29 may be effected at will by simply rotating the nut 35 which is so located as to be accessible to the operator without necessitating the removal of component parts.

As shown, the handle grip 51 is fastened to the handle 44 by two bolts 50, either of which may be removed to enable placement of the hand grip in the position indicated by the broken lines in Fig. 2 to eliminate the possibility of damage thereto during transportation and periods of inactivity.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a hoisting mechanism, a base frame, a pair of coaxially disposed spaced spoollike drums rotatably carried by said frame, bearing supports for said drums extending upwardly from said frame one on each end of said drums, said supports being coaxial with said drums and of a cross sectional shape corresponding substantially to the ends of said drums, an apertured lug extending upwardly from the top of each support, a tie rod for said supports extending through said lugs, and a brake mechanism for each of said drums entirely carried by said tie rod.

2. In a hoisting mechanism, a base frame, a pair of coaxially disposed spaced spoollike drums rotatably carried by said frame, bearing supports for said drums extending upwardly from said frame one on each end of said drums, said supports being coaxial with said drums and of a cross sectional shape corresponding substantially to the ends of said drums, an apertured lug extending upwardly from the top of each support, a tie rod for said supports extending through said lugs, a brake mechanism for each of said drums entirely carried by said tie rod including a brake band, and pivotal connections between the ends of said brake band and the tie rod including a pivot for each connection formed by said tie rod.

3. In a hoisting mechanism, a base frame, a pair of coaxially disposed spaced spoollike drums rotatably carried by said frame, bearing supports for said drums extending upwardly from said frame one on each end of said drums, said supports being coaxial with said drums and of a cross sectional shape corresponding substantially to the ends of said drums, an apertured lug extending upwardly from the top of each support, a tie rod for said supports extending through said lugs, a brake mechanism for each of said drums entirely carried by said tie rod including a brake band, a pivotal connection between one end of said band and the tie rod wherein the tie rod forms a pivot for said connection, length adjusting means intermediate the ends of said connection, and a pivotal connection between the other end of said band and said tie rod.

4. In a hoisting mechanism, a base frame, a pair of coaxially disposed spaced spoollike drums rotatably carried by said frame, bearing supports for said drums extending upwardly from said frame one on each end of said drums, said supports being coaxial with said drums and of a cross sectional shape corresponding substantially to the ends of said drums, an apertured lug extending upwardly from the top of each support, a tie rod for said supports extending through said lugs, a brake mechanism for each of said drums entirely carried by said tie rod including a brake band, a pivotal connection between one end of said band and the tie rod wherein the tie rod forms a pivot for said connection, tension imparting means for said band intermediate the ends of said connection, and a pivotal connection between the other end of said band and said tie rod.

EARL B. LEAR.